United States Patent
Schneider

[11] 3,909,475
[45] Sept. 30, 1975

[54] MOULDABLE COMPOSITION BASED ON THERMOSETTING RESIN

[75] Inventor: Charles Schneider, Vernaison, France

[73] Assignee: Rhone-Poulenc S.A., Paris, France

[22] Filed: Nov. 5, 1973

[21] Appl. No.: 412,962

[30] Foreign Application Priority Data
Nov. 8, 1972    France .................................. 72.39515

[52] U.S. Cl. ......................... 260/29.1 SB; 260/37 N
[51] Int. Cl.² ........................................... C08L 79/08
[58] Field of Search .......... 260/857 PI, 37 N, 37 SB, 260/824, 29.1 SB, 787 F

[56] References Cited
UNITED STATES PATENTS

| | | | |
|---|---|---|---|
| 3,440,203 | 4/1969 | Boldebuck ......................... | 260/33.4 |
| 3,632,440 | 1/1972 | Preston .............................. | 117/218 |
| 3,717,615 | 2/1973 | Holub ............................. | 260/78 UA |
| 3,781,237 | 12/1973 | Alvino ......................... | 260/29.1 SB |

*Primary Examiner*—Lewis T. Jacobs
*Attorney, Agent, or Firm*—Stevens, Davis, Miller & Mosher

[57] ABSTRACT

A mouldable composition is provided which comprises (a) a prepolymer having a softening point from 50° to 220°C. produced from an N,N'-bis-imide of the general formula:

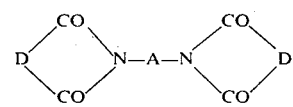

in which D represents a divalent organic radical containing an olefinic carbon-carbon double bond and A represents a divalent radical possessing 2 to 30 carbon atoms, and a polyamine of the general formula:

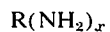

in which $x$ is an integer at least equal to 2 and R represents an organic radical of valency $x$, 0.55 to 25 mols of bis-imide being used per molar —NH₂ group provided by the polyamine, (b) filler, and (c) based on the weight of the prepolymer, 0.1 to 10% by weight of a radical-type initiator and 0.05 to 10% by weight of an organopolysiloxane oil or of a mixture comprising an oil and an organopolysiloxane resin. Such compositions can be moulded by heating to give articles which come away easily from the mould. The compositions also possess the advantage that the moulding temperatures need not be as high as those which are customary for polyimide compositions and the moulding takes place quickly.

9 Claims, No Drawings

MOULDABLE COMPOSITION BASED ON THERMOSETTING RESIN

The present invention relates to a mouldable composition based on thermosetting resin.

The present invention provides a mouldable composition, intended more particularly for compression or transfer mouldings, which composition comprises a prepolymer produced by reacting an N,N'-bis-imide of an olefinically unsaturated dicarboxylic acid with a polyamine, and filler, and also relative to the weight of the prepolymer, 0.1 to 10% by weight of a radical-type initiator and 0.05 to 10% by weight of an organopolysiloxane oil or of a mixture of an oil and an organopolysiloxane resin.

The prepolymers used in the invention have a softening point from 50° to 220°C and are soluble in various organic solvents such as dimethylformamide, N-methylpyrrolidone and dimethylacetamide. These prepolymers are produced by reacting a bis-imide of the general formula:

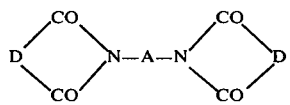  (I)

in which D represents a divalent organic radical containing an olefinic carbon-carbon double bond and A represents a divalent organic radical possessing 2 to 30 carbon atoms, with a polyamine of the general formula:

$$R(NH_2)_x \quad (II)$$

in which $x$ is an integer at least equal to 2 and R represents an organic radical of valency $x$, the quantity of bis-imide being 0.55 to 25 moles per molar —NH₂ group provided by the polyamine.

In formula (I), the symbol D is derived from a dicarboxylic ethylenic acid anhydride of the general formula:

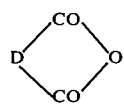  (III)

which can be, for example, maleic anhydride, citraconic anhydride, itaconic anhydride, pyrocinchonic anhydride or dichloromaleic anhydride or the product of a Diels-Alder reaction between one of these anhydrides and an acyclic, alicyclic or heterocyclic diene. As far as the anhydrides which result from a diene synthesis are concerned, reference can be made to, for example, "Organic Reactions" Volume IV (John Wiley and Sons, Inc.); tetrahydrophthalic anhydride and endomethylenetetrahydrophthalic anhydride may be mentioned in particular.

The symbol A suitably represents a linear or branched alkylene radical having less than 13 carbon atoms, a phenylene radical, a cyclohexylene radical, a

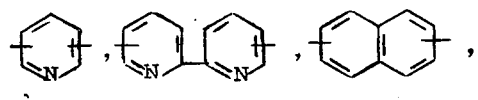

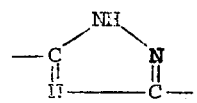

or

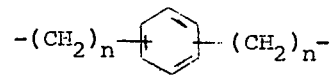

radical wherein $n$ represents an integer from 1 to 3. The symbol A can also comprise several phenylene or cyclohexylene radicals bonded to one another by a simple valency bond or by an inert atom or group such as —O—, —S—, an alkylene group with 1 to 3 carbon atoms, —CO—, —SO₂—, —NR₁—, —N=N—, —CONH—, —COO—, —P(O)R₁—, —CONH—X-—NHCO—,

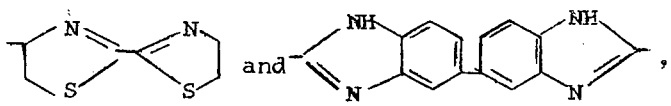

wherein $R_1$ represents a hydrogen atom, an alkyl radical with 1 to 4 carbon atoms, a phenyl radical or a cyclohexyl radical, and X represents an alkylene radical having less than 13 carbon atoms. The various phenylene or cyclohexylene radicals can be substituted by methyl groups.

Specific examples of bis-imides of formula (I) include: N,N'-ethylene-bis-maleimide, N,N'-hexamethylene-bis-maleimide, N,N'-(meta-phenylene)-bis-maleimide, N,N'-(para-phenylene)-bis-maleimide, N,N'-4,4'-diphenylmethane-bis-maleimide, N,N'-4,4'-(diphenyl ether)-bis-maleimide, N,N'-4,4'-(diphenyl sulphone)-bis-maleimide, N,N'-4,4'-dicyclohexylmethane-bis-maleimide, N,N'-4,4'-(3,5-diphenyl-pyridine)-bis-maleimide, N,N'-(pyridine-2,6-diyl)-bis-maleimide, N,N'-α,α'-4,4'-dimethylenecyclohexane-bis-maleimide, N,N'-(meta-xylylene)-bis-maleimide, N,N'-(para-xylylene)-bis-maleimide, N,N'-4,4'-diphenylcyclohexane-bis-maleimide, N,N'-(metaphenylene(-bis-tetrahydrophthalimide, N,N'-4,4'-diphenylmethane-bis-citraconimide, N,N'-4,4'-(1,1-diphenylpropane)-bis-maleimide, N,N'-4,4'-(1,1,1-triphenylethane)-bis-maleimide, N,N'-4,4'-triphenylmethane-bis-maleimide, N,N'-3,5-(1,2,4-triazole)-bis-maleimide and N,N'-4,4'-diphenylene-bis-maleimide.

These bis-imides can be prepared by applying the methods described in, for example, U.S. Pat. No. 3,018,290 and British Pat. No. 1,137,592.

The polyamine of formula (II) can be a dimprimary diamine of the general formula:

$$H_2N - E - NH_2 \qquad (IV)$$

in which the symbol E represents one of the radicals defined under A. Examples of diprimary diamines which can be used for the preparation of the prepolymer include 4,4'-diamino-dicyclohexylmethane, 1,4-diamino-cyclohexane-2,6-diamino-pyridine, meta-phenylenediamine, para-phenylenediamine, 4,4'-diamino-diphenylmethane, 2,2-bis-(4-amino-phenyl)-propane, benzidine, 4,4'-diaminophenylether, 4,4'-diamino-phenyl sulphide, 4,4'-diaminodiphenyl-sulphone, bis-(4-amino-phenyl)-methylphosphine oxide, bis-(4-amino-phenyl)-phenylphosphine oxide, N,N-bis-(4-amino-phenyl)-methylamino,1,5-diaminonaphthalene, hexamethylene-diamine, 6,6'-diamino-2,2'-dipyridyl, 4,4'-diamino-benzophenone, 4,4'-diamino-azobenzene, bis-(4-amino-phenyl)-phenylmethane, 1,1-bis-(4-amino-phenyl)-cyclohexane, 1,1-bis-(4-amino-3-methylphenyl)-cyclohexane, 2,5-bis-(m-aminophenyl)-1,3,4-oxadiazole, 2,5-bis-(p-amino-phenyl)-,3,4-oxadiazole, 2,5-bis-(m-aminophenyl)-thiazolo-(4,5-d)-thiazole, 5,-5'-di-(m-aminophenyl)-2,2'-bis-(1,3,4-oxadiazolyl), 4,4'-bis-(p-aminophenyl)-2,2'-dithiazole, m-bis-[2-(4-p-aminophenyl)-thiazolyl]benzene, 2,2'-bis-(m-aminophenyl)-5,5'-dibenzimidazole, 4,4'-diamino-benzanilide, phenyl 4,4'-diamino-benzoate, N,N'-bis-(4-amino-benzoyl)-p-phenylenediamine, 3,5-bis-(m-aminophenyl)-4-phenyl-1,2,4-triazole, N,N'-bis-(p-amino-benzoyl)-4,4'-diaminodiphenylmethane, bis-p-(4-amino-phenoxycarbonyl)-benzene, bis-p-(4-amino-phenoxy)-benzene, 3,5-diamino-1,2,4-triazole, 1,1-bis-(4-amino-phenyl)-1-phenyl-ethane and 3,5-bis-(4-amino-phenyl)-pyridine.

Amongst the polyamines of formula (II) which are not diprimary diamines, those which have fewer than 50 carbon atoms and which possess 3 to 5 $-NH_2$ groups per molecule are preferred. The $-NH_2$ groups can be carried by a benzene ring optionally substituted by methyl groups, or a naphthalene pyridine or triazine nucleus; they can also be carried by several benzene rings bonded to one another by a simple valency bond or by an inert atom or group which can be one of those described above within the definition of the symbol A, or

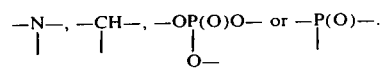

As examples of such polyamines, there may be mentioned 1,2,4-triamino-benzene, 1,3,5-triaminobenzene 2,4,6-triamino-toluene, 2,4,6-triamino-1,3,5-trimethyl-benzene, 1,3,7-triamino-naphthalene 2,4,4'-triamino-diphenyl, 2,4,6-triamino-pyridine, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyl-diphenylmethane, N,N,N-tri-(4-amino-phenyl)amine, tri-(4-amino-phenyl)methane, 4,4',4''-triamino-phenyl, orthophosphate, tri-(4-amino-phenyl)-phosphine oxide, 3,5,4'-triamino-benzanilide, melamine, 3,5,3',5'-tetraamino-benzophenone, 1,2,4,5-tetraamino-benzene, 2,3,6,7-tetraamino-naphthalene, 3,3'-diamino-benzidine, 3,3',4,4'-tetraamino-phenyl ether, 3,3',4,4'-tetraaminodiphenylmethane, 3,3',4,4'-tetraamino-diphenylsulphone, 3,5-bis-(3-4'-diamino-phenyl)-pyridine and oligomers of the average formula:

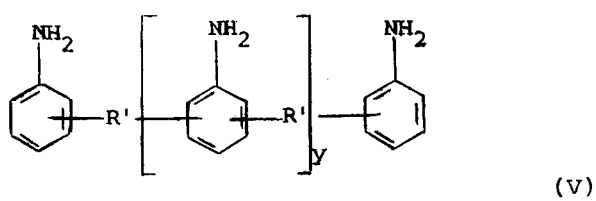

(V)

in which Y represents a number ranging approximately from 0.1 to 2 and R' represents a divalent hydrocarbon radical with 1 to 8 carbon atoms derived from an aldehyde or a ketone of the general formula:

$$O = R' \qquad (VI)$$

in which the oxygen atom is bonded to a carbon atom of the radical R'; typical aldehydes and ketones are formaldehyde, acetaldehyde, benzaldehyde, oenanthal, acetone, methyl ethyl ketone, 2-hexanone, cyclohexanone, and acetophenone. These oligomers possessing amino groups can be produced in accordance with known processes such as those which are described in French Pat. Nos. 1,430,977, 1,481,935 and 1,533,696; the crude mixtures of oligomers produced according to these processes can be enriched with one or more of their constituents, for example by distillation under reduced pressure.

A prepolymer produced by reacting N,N'-4,4'-diphenylmethane-bis-maleimide with bis-(4-aminophenyl)-methane with an

molar ratio of from 1.2 to 5 is preferably used in the present invention.

The preparation of the prepolymer can be carried out in bulk or in a polar solvent such as cresol, dimethylformamide, N-methylpyrrolidone, dimethylacetamide, N-methylcaprolactam or chlorobenzene. It is to be understood that it is possible to use one bis-imide or a mixture of several bis-imides. Likewise, it is clear that the term "polyamine" is used to denote not only single polyamines but also mixtures of polyamines with the same number of functional groups or mixtures of polyamines, at least two of which possess different numbers of functional groups. One or more polyamines with a higher number of functional groups are generally used and they can suitably represent, by weight, up to 50% of the weight of the diamines employed. The quantities of reagents are preferably chosen so that there are 0.6 to 2.5 mols of bis-imide per molar $NH_2$ group provided by the polyamine. The preparation of the prepolymers can be carried out in the presence of a strong acid catalyst. The term "strong acid" is used herein, in the Bronsted sense, to denote mono- or poly-acids, at least one of the acid groups of which has an ionisation constant pKa less than 4.5. They can be inorganic acids such as hydrochloric, sulphuric, nitric, or phosphoric acid, optionally substituted by an organic radical, such as sulphonic and phosphonic acids. They can also be carboxylic acids which either have a simple structure or which possess radicals of formula D or substituent groups which do not interfere with reaction between the bis-imide (I) and the polyamine (II). The preferred acid is maleic acid. Generally from 0.5 to 5% by weight of acid relative to the weight of the bis-imide (I) are employed.

The compositions of the present invention contain filler, for example, in an amount as much as 80% of the weight of the mixture of polymer + filler. These fillers can be fibrous or pulverulent. Particles of graphite, metal particles, particles of mica, molybdenum sulphide or polytetrafluoroethylene, glass microspheres or asbestos or glass fibres are typical fillers which may be used. The particle size of the pulverulent fillers is generally between 0.1 and 50 $\mu$; the length of the fibres is usually less than 25 mm. The proportion of fillers is preferably between 10 and 75% by weight of the prepolymer/filler mixture.

The characteristic feature of the compositions of this invention is that they contain a radical-type initiator and an organopolysiloxane oil or a mixture of an oil and an organopolysiloxane resin. The initiator can be a peroxide compound such as dilauroyl peroxide, dicumyl peroxide, mixed t-butyl and cumyl peroxide or 2,5-dimethyl-2,5-di-(t-butyl-peroxy)-3-hexyne. It can also be a diazo compound such as $\alpha,\alpha$-azo-bis-isobutyronitrile. The quantity of initiator preferably represents 1 to 5% by weight based on the weight of the prepolymer.

The proportion of organosilicon oil or of the mixture of oil and organosilicon resin preferably represents 0.5 to 3% by weight based on the weight of the prepolymer.

The organopolysiloxane oil is generally one represented by the formula:

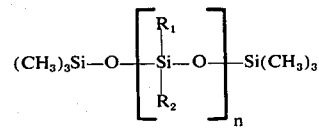

in which $n$ represents a positive integer or zero, generally less than 1,500; the symbol $R_1$, which can differ from one unit to another, can represent an alkyl radical with 1 to 4 carbon atoms, a vinyl radical or a phenyl radical, these alkyl and phenyl radicals being either unsubstituted or substituted by one or more halogen atoms or a cyano group; and the symbol $R_2$ can have the same meaning as $R_1$ or can represent a hydrogen atom or a trimethylsiloxy group.

The viscosity of the organopolysiloxane oil is usually between 5 and 100,000 and preferably between 50 and 5,000 cSt at 20°C.

This organopolysiloxane oil can be used alone. It can also be used as a mixture with a methylpolysiloxane resin consisting essentially of trimethylsilox units and $SiO_2$ units, the ratio of the number of methyl groups to the number of silicon atoms being generally between 0.8/1 and 1.5/1, and preferably between 1.1/1 and 1.3/1. These resins can be prepared by, for example, cohydrolysis of $(CH_3)_3SiX$ and $SiX_4$, in which formulae the symbol X represents a hydrolysable group. When a mixture comprising the oil and the resin defined above is used, the proportion of resin is usually less than 50% by weight of the mixture.

For simplification, the expression "organopolysiloxane oil" is used hereafter to denote both the oil used alone and the oil/resin mixture.

This invention also provides a process for the preparation of the compositions of the present invention. According to this, a mixture, prepared separately, of the catalyst and the organopolysiloxane oil is incorporated into the prepolymer. According to a first procedure it is possible, in a first stage, to prepare a suspension (or emulsion) of the initiator in the organopolysiloxane oil at a temperature below the decomposition temperature of the initiator but close to or above the melting point of the initiator, and then to incorporate this suspension into the prepolymer also heated to a temperature close to or above the melting point of the initiator. This temperature is generally above ambient temperature and preferably between 50° and 80°C. Taking the reagents employed and the

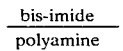

ratio into account, the prepolymer can, at this temperature, either be still in the solid state or have passed into a more or less viscous liquid state. The filler can be incorporated either before or after the introduction of the catalyst system. If they are incorporated before, it is possible either to mix the filler with the prepolymer prepared separately, or to carry out the prepolymerisation of the bis-imide and the polyamine in the presence of the filler.

According to a second procedure, the initiator and the organopolysiloxane oil are mixed with the prepolymer, optionally containing filler, in the form of an aqueous dispersion or emulsion, it being possible for this dispersion or emulsion to be prepared at a temperature below or above the melting point of the initiator. Generally, when the initiator is in the molten state, the prepolymer is itself heated at the time of mixing it with the emulsion. When the initiator is in the solid state, the mixing of the suspension and the prepolymer can be carried out under cold or hot conditions. In order to prepare the emulsion or dispersion, it is advantageous to use an emulsifier such as, for example, polyvinyl alcohol. The proportion of emulsifier can generally be as much as 30% by weight of the mixture of initiator and organopolysiloxane oil, it being possible for the amount of water to be, for example, as much as 95% of the weight of the emulsion or dispersion.

The compositions according to the invention, which can be rendered homogeneous by simple stirring, are particularly suitable for the production of moulded articles in accordance with transfer or compression moulding techniques. Naturally, these compositions can also be employed in accordance with the other usual techniques for processing thermosetting materials, such as, for example, extrusion, injection and cold agglomeration under pressure followed by stoving (free-sinter). These compositions posses the advantage of leading to articles which do not stick to the walls of the moulds in which they are manufactured. Furthermore, these catalysed compositions can be moulded at temperatures which can be 20° to 80°C lower than those necessary for non-catalysed compositions, and at markedly higher rates.

During the moulding operation, which is generally carried out at a temperature above the softening point of the prepolymer and at the decomposition temperature of the initiator, the prepolymer changes into a three-dimensional resin, imparting good mechanical properties and excellent heat stability to the articles produced. After moulding, these articles can be post-stoved for for example, 4 to 48 hours at a temperature which can be as high as 300°C.

These articles, moulded in their final shape or machined from semi-manufactured products, can be used in numerous applications which vary according to the nature and quantity of fillers employed. They can be used especially for the production of brake or clutch facings, self-lubricating bearings, valve seats and compressor blades.

The following Examples further illustrate the present invention. Temperatures are in degrees Centigrade.

EXAMPLE 1 a. 50 g of dicumyl peroxide and 50 g of an organopolysiloxane composition comprising 70% by weight of a trimethylsilyl group-terminated dimethylpolysiloxane oil, (viscosity: 300 cPo at 25°) and 30% by weight of a methylpolysiloxane resin consisting of trimethylsiloxy and $SiO_2$ units, are introduced into a flask.

The whole is heated on a water bath at 50°, with stirring, to form a suspension of the initiator in the oil. b. 525 g of a prepolymer with a softening point of 90°C, in the form of powder, prepared from N,N'-4,4'-diphenylmethane-bis-maleimide and bis-(4-aminophenyl)-methane $$\left(\frac{\text{imide}}{\text{diamine}} \text{molar ratio} = 2.5\right)$$

are introduced into a mixer and heated at 60°, with stirring, for 5 minutes.

10.5 g of the catalyst suspension described under a) are then introduced into the prepolymer and stirring is continued for 30 minutes at 60°.

The mixture obtained is collected and introduced at ambient temperature into a mixer together with 975 g of glass fibres (fibre length: 6 mm). The whole is stirred so as to mix the glass fibres and the prepolymer well.

c. This composition is spread over a plate (thickness of the layer: 15 mm) and is heated at 130°C for 17 minutes. The product obtained is then preformed at 120° under a pressure of 200 bars (duration of the operation: 1 minute) and then the preform is introduced into a mould heated to 180°. It is pressed under 200 bars at a temperature of 180° for 6 minutes. The article produced has the following dimensions 125 × 125 × 6 mm. It is then reheated for 24 hours at 250° (atmospheric pressure).

This article possesses the following properties:

Flexural strength (at 250°C): 23 kg/mm² (ASTM Standard Specification D 790)

Flexural modulus (250°C): 1,700 kg/mm² (ASTM Standard Specification D 790).

EXAMPLE 2 a. 300 g of water and 20 g of polyvinyl alcohol are introduced into a flask. The whole is stirred, whilst heating at 45°C.

100 g of dicumyl peroxide and 100 g of the organopolysiloxane composition used in Example 1 are introduced, with stirring, into a 500 cm³ dropping funnel heated to 55°C.

The contents of the dropping funnel are run, over the course of 1 hour 40 minutes, with stirring, into the flask containing the water and the polyvinyl alcohol.

b. 573g of a prepolymer in powder form, similar to that of Example 1, and 200 g of glass microspheres (average diameter between 10 and 50μ) are introduced into a mixer and stirred at ambient temperature. 36 g of the catalyst dispersion (cooled at ambient temperature) are then added over the course of 5 minutes and stirring is continued for a further 5 minutes.

The whole is collected and introduced into a mixer together with 200 g of glass fibres (length 3 mm). This operation is carried out at ambient temperature.

This composition is spread over a plate (thickness 20 mm) and is heated at 130° for 22 minutes.

The product thus produced is converted into pellets of diameter 55 mm and thickness 40 mm under a pressure of 200 bars (temperature 140°, duration 3 minutes), and is then reheated for 35 minutes at 120° (atmospheric pressure).

The transfer moulding of small plates from the pellets thus formed is carried out under the following conditions:

Transfer pressure: 300 bars

Moulding temperature: 170°C

Duration: 6 minutes.

The plates have the following dimensions: 125 × 125 × 6 mm. The mechanical properties of these small plates are as follows:

Flexural strength at 25° : 12 kg/mm²

Flexural strength at 250°: 9 kg/mm²
Flexural modulus at 25°: 850 kg/mm²
Flexural modulus at 250°: 500 kg/mm²

EXAMPLE 3

The following constituents are introduced successively into a mixer:

78.5 g of the prepolymer described in Example 1,
20 g. of polytetrafluoroethylene powder (average size of the particles: 1 to 15 $\mu$) and
1.5 g of molybdenum disulphide powder (average size of the particles less than 10 $\mu$).

The whole is stirred for 15 minutes, whilst heating at 60°C.

2.35 g. of a suspension containing 66% by weight of dicumyl peroxide and 34% of organopolysiloxane composition are then introduced into the mixture, over the course of 1 minute; this suspension is prepared in accordance with the technique described in Example 1 (a). The whole is stirred for 30 minutes. The mixture is collected and spread over a plate (thickness 10 mm), and heated at 130° for 30 minutes. The product is ground and pellets are formed under 400 bars under cold conditions (25°); these pellets are then heated at 130° for 18 minutes in a ventilated oven. Transfer moulding is then carried out under the conditions described in Example 2 (except for the temperature which is 190° instead of 170°).

The mechanical properties of the small plates obtained after post-heating at 200° (24 hours) are:

Flexural strength at 25°: 6 kg/mm²
Flexural strength at 250°: 4 kg/mm²
Flexural modulus at 25°: 350 kg/mm²
Flexural modulus at 250°: 250 kg/mm²

EXAMPLE 4

The following constituents are introduced into a mixer: 75 g of the prepolymer of Example 1 and 25 g of graphite (average size of the particles: less than 50 $\mu$).

The mixture is stirred and heated at 50° for 10 minutes.

3 g of the catalyst suspension used in Example 1 are added.

The composition is spread over a plate (thickness 15 mm) and heated at 130° for 28 minutes. After cooling, the product is ground and then preformed at ambient temperature under 400 bars. The preforms are placed in a ventilated oven (15 minutes at 130°C). Compression moulding of the preforms is then carried out (temperature: 180° — pressure: 200 bars — duration: 6 minutes). The dimensions of the articles produced are: 150 × 12.7 × 6 mm).

The mechanical properties at 250° are:
Flexural strength: 5 kg/mm²
Flexural modulus: 350 kg/mm²

We claim:

1. In a mouldable composition which consists essentially of (a) a prepolymer, having a softening point from 50 to 220°C. produced from an N,N'-bis-imide of the general formula:

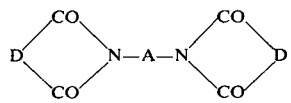

(I)

in which D represents a divalent organic radical containing an olefinic carbon-carbon double bond and A represents a divalent radical possessing 2 to 30 carbon atoms, and a polyamine of the general formula:

$$R(NH_2)_x \quad (II)$$

in which x is an integer at least equal to 2 and R represents an organic radical of valency x, 0.55 to 25 mols of bis-imide being used per molar —NH₂ group provided by the polyamine and (b) filler, the improvement wherein the composition consists essentially of a homogeneous mixture of (a) and (b) with (c) a mixture of, based on the weight of the prepolymer, about 0.1 to 10% by weight of a radical-type initiator and about 0.05 to 10% by weight of an organopolysiloxane oil having the formula:

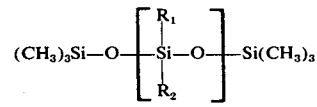

in which n represents 0 or a positive integer each $R_1$ radical, which may be the same or different represents an alkyl radical with 1 to 4 carbon atoms, a vinyl radical or a phenyl radical, the alkyl and phenyl radicals being either unsubstituted or substituted by at least one halogen atom or cyano group; and $R_2$ is as defined under $R_1$ or represents a hydrogen atom or a trimethylsiloxy group and having a viscosity between 50 and 5,000 cSt at 20°C. or of a mixture comprising a said oil and an organopolysiloxane resin consisting essentially of trimethylsiloxy units and $SiO_2$ units, the ratio of the number of methyl groups to the number of silicon atoms being between 0.8/1 and 1.5/1, the proportion of resin in said mixture being up to 50% by weight of the mixture.

2. A composition according to claim 1, in which the bis-imide is N,N'-4,4'-diphenylmethane-bis-maleimide.

3. A composition according to claim 1, in which the polyamine is 4,4'-diamino-diphenylmethane.

4. A composition according to claim 1, in which the filler represents 10 to 75% by weight of the mixture of prepolymer and filler.

5. A composition according to claim 1, in which the initiator is an organic peroxide.

6. A composition according to claim 1, in which the filler consist of graphite, metal, mica, molybdenum sulphide or polytetrafluoroethylene particles, glass microspheres, or asbestos or glass fibres.

7. Process for the preparation of a composition as defined in claim 1, which comprises suspending the initiator in the organosilicon oil or the oil/resin mixture at a temperature close to or above the melting point of the initiator but below its decomposition temperature, and then mixing this suspension with the prepolymer and filler heated to a temperature substantially equal to the temperature of the suspension.

8. Process according to claim 7, in which the temperature is between 50° and 80°C.

9. A process for preparing a moulded article with comprises moulding a composition as defined in claim 1, at a temperature above the softening point of the prepolymer and the decomposition temperature of the initiator.

* * * * *